(12) United States Patent
Kuo

(10) Patent No.: US 8,305,961 B2
(45) Date of Patent: Nov. 6, 2012

(54) METHOD AND RELATED COMMUNICATIONS DEVICE FOR IMPROVING DISCONTINUOUS RECEPTION FUNCTIONALITY

(75) Inventor: Richard Lee-Chee Kuo, Taipei (TW)

(73) Assignee: Innovative Sonic Limited, Port Louis (MU)

( * ) Notice: Subject to any disclaimer, the term of this patent is extended or adjusted under 35 U.S.C. 154(b) by 584 days.

(21) Appl. No.: 12/346,836

(22) Filed: Dec. 31, 2008

(65) Prior Publication Data

US 2009/0180427 A1 Jul. 16, 2009

Related U.S. Application Data

(60) Provisional application No. 61/020,149, filed on Jan. 10, 2008.

(51) Int. Cl.
*H04W 4/00* (2009.01)
(52) U.S. Cl. .......................... 370/328; 370/338
(58) Field of Classification Search .................. None
See application file for complete search history.

(56) References Cited

U.S. PATENT DOCUMENTS

| 2003/0026248 | A1 | 2/2003 | Hiroki |
| 2003/0028837 | A1 | 2/2003 | Oh |
| 2007/0291729 | A1 | 12/2007 | Dalsgaard |
| 2007/0300120 | A1 | 12/2007 | Kim |
| 2009/0046627 | A1* | 2/2009 | Xu ................................ 370/328 |

FOREIGN PATENT DOCUMENTS

| EP | 1 361 689 A1 | 11/2003 |
| EP | 1 841 249 A1 | 10/2007 |
| EP | 1 852 994 A1 | 11/2007 |
| JP | 2009517932 A | 4/2009 |
| KR | 20030008324 A | 1/2003 |
| KR | 1020030087882 A | 11/2003 |
| KR | 1020060061897 A | 6/2006 |
| KR | 1020070109313 A | 11/2007 |
| WO | 2007059791 A1 | 5/2007 |

OTHER PUBLICATIONS

Office Action on corresponding foreign application (JP 2009-004615) from the JPO dated May 24, 2011.
Nokia:"DRX parameters in LTE", 3GPP TSG-RAN WG2 Meeting #57bis, R2-071285, XP003023549, Mar. 26-30, 2007, St. Julian's, Malta.
Research in Motion Limited: "DRX Operation During Handover", 3GPP TSG-RAN-WG2 Meeting #58, R2-071956, XP002455654, May 7-11, 2007, Kobe, Japan.
3GPP TSG-RAN WG2 Meeting #60bis, Sevilla, Spain, Jan. 14-18, 2008 (R2-080546).
Notice of Allowance on corresponding foreign application (KR 10-2009-0001420) issued from the KIPO dated May 31, 2011.
3GPP, 3GPP R2-080021, Stage 3 Description of DRX, Jan. 2008.
3GPP, 3GPP TS 36.321 v1.3.0, 3rd Generation Partnership Project-;Technical Specification Group Radio Access Network; Evolved Universal Terrestrial Radio Access (E-UTRA) Medium Access Control (MAC) protocol specification (Release 8) , Nov. 2007.

* cited by examiner

*Primary Examiner* — John Blanton
(74) *Attorney, Agent, or Firm* — Blue Capital Law Firm, P.C.

(57) ABSTRACT

A method for improving discontinuous reception (DRX) functionality for a user equipment (UE) of a wireless communication system is disclosed. The method includes steps of starting a DRX Retransmission Timer to monitor a Physical Downlink Control Channel (PDCCH); and stopping the DRX Retransmission Timer when a downlink transmission for a Hybrid Automatic Repeat Request (HARQ) process is indicated by the monitored PDCCH no matter whether the downlink transmission is successfully decoded.

10 Claims, 6 Drawing Sheets

METHOD AND RELATED COMMUNICATIONS DEVICE FOR IMPROVING DISCONTINUOUS RECEPTION FUNCTIONALITY

CROSS REFERENCE TO RELATED APPLICATIONS

This application claims the benefit of U.S. Provisional Application No. 61/020,149, filed on Jan. 10, 2008 and entitled "Method and Apparatus for Stopping DRX Retransmission Timer in a Wireless Communications System", the contents of which are incorporated herein by reference.

BACKGROUND OF THE INVENTION

1. Field of the Invention

The present invention relates to a method and related communications device for improving discontinuous reception (DRX) functionality in a wireless communications system, and more particularly, to a method and related communications device for improving stop mechanism of a DRX Retransmission Timer of the DRX functionality in a wireless communications system.

2. Description of the Prior Art

The third generation mobile telecommunications system (called 3G system) provides high frequency spectrum utilization, universal coverage, and high quality, high-speed multimedia data transmission, and also meets all kinds of QoS requirements simultaneously, providing diverse, flexible, two-way transmission services and better communication quality to reduce transmission interruption rates.

Long Term Evolution wireless communications system (LTE system), an advanced high-speed wireless communications system established upon the 3G mobile telecommunications system, supports only packet-switched transmission, and tends to implement both Medium Access Control (MAC) layer and Radio Link Control (RLC) layer in one single communication site, such as in Node B alone rather than in Node B and RNC (Radio Network Controller) respectively, so that the system structure becomes simple.

Targeting on the present LTE system, Discontinuous Reception (DRX) functionality is applied to the MAC layer for allowing a user equipment (UE) to enter a standby mode during certain periods of time and stopping monitoring a Physical downlink Control Channel (PDCCH), so as to reduce power consumption of the UE.

In cases of using the DRX functionality, whenever a new DRX cycle begins, an On Duration Timer is started and the UE is awaked to monitor the PDCCH until the On Duration Timer expires. In addition, when a DRX Inactivity Timer or a DRX Retransmission Timer is started, the UE also monitors the PDCCH.

During the time when the UE monitors the PDCCH, if the PDCCH indicates the UE to receive or transmit a new transmission packet, the DRX Inactivity Timer is started or restarted for allowing the UE to continue monitoring the PDCCH, so as to prevent missing reception or transmission of following packets.

On the other hand, if the PDCCH indicates the UE to receive a packet but the packet cannot be decoded successfully on a Downlink Share Channel (DL-SCH), the MAC layer of the UE would perform a Hybrid Automatic Repeat Request (HARQ) process to request a retransmission of the packet. Since the UE would not receive any retransmission packet during a signaling round trip time (RTT) of the HARQ process, a HARQ RTT Timer is thus configured by the DRX functionality to allow the UE to enter into the standby mode during this round trip time. So the power consumption of the UE can further be saved.

After the HARQ RTT Timer expires, the DRX Retransmission Timer is started by the DRX functionality to awake the UE to start monitoring the PDCCH for dectecting the retransmission packet of the HARQ process. In such a situation, if the retransmission packet of the HARQ process is successfully decoded, the DRX Retransmission Timer is stopped. Otherwise, the DRX Retransmission Timer is kept running until expiration, at which time the UE enters into the standby mode again.

Please refer to FIG. 1, which illustrates operation of a DRX Retransmission Timer according to the prior art. As shown in FIG. 1, at time T1, if the PDCCH indicates the UE a downlink transmission of a HARQ process, the HARQ RTT Timer is started. Since no retransmission packets would be received by the UE when the HARQ RTT Timer is running, the UE can go to sleep on this period of time to save power consumption. After the HARQ RTT Timer expires, the DRX Retransmission Timer is started and the UE starts to monitor the PDCCH for detecting retransmission packets of the HARQ process.

Since the DRX Retransmission Timer is running, if the PDCCH indicates the UE another downlink transmission packet for the HARQ process at time T2, for example, the HARQ RTT Timer is started again. At this time, the DRX Retransmission Timer is still running. Thus, the UE is awake to monitor the PDCCH even though no retransmission packets for the HARQ process would be received by the UE when the HARQ RTT Timer is running, resulting in the power of the UE wastes unnecessarily.

In other words, during the operation of the DRX Retransmission Timer, the UE would not receive any retransmission packet of the concerned HARQ process in situations such as the HARQ RTT Timer is running. Thus, it is unnecessary for the UE to keep monitoring the PDCCH at this period of time.

SUMMARY OF THE INVENTION

It is therefore an objective of the present invention to provide a method and related communications device for a user equipment (UE) improving discontinuous reception (DRX) functionality in a wireless communications system, so as to reduce power consumption of the UE and extend standby time.

According to the present invention, a method of improving discontinuous reception (DRX) functionality for an user equipment (UE) of a wireless communication system is disclosed. The method includes steps of starting a DRX Retransmission Timer for monitoring a Physical Downlink Control Channel (PDCCH); and stopping the DRX Retransmission Timer when the PDCCH indicates a downlink transmission for a Hybrid Automatic Repeat Request (HARQ) process.

According to the present invention, a communications device for a user equipment (UE) improving discontinuous reception (DRX) functionality in a wireless communication system is disclosed. The communications device includes a processor for executing a process, and a storage device, coupled to the processor, for storing a program for executing the process. The process includes steps of starting a DRX Retransmission Timer for monitoring a Physical Downlink Control Channel (PDCCH); and stopping the DRX Retransmission Timer when the PDCCH indicates a downlink transmission for a Hybrid Automatic Repeat Request (HARQ) process.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
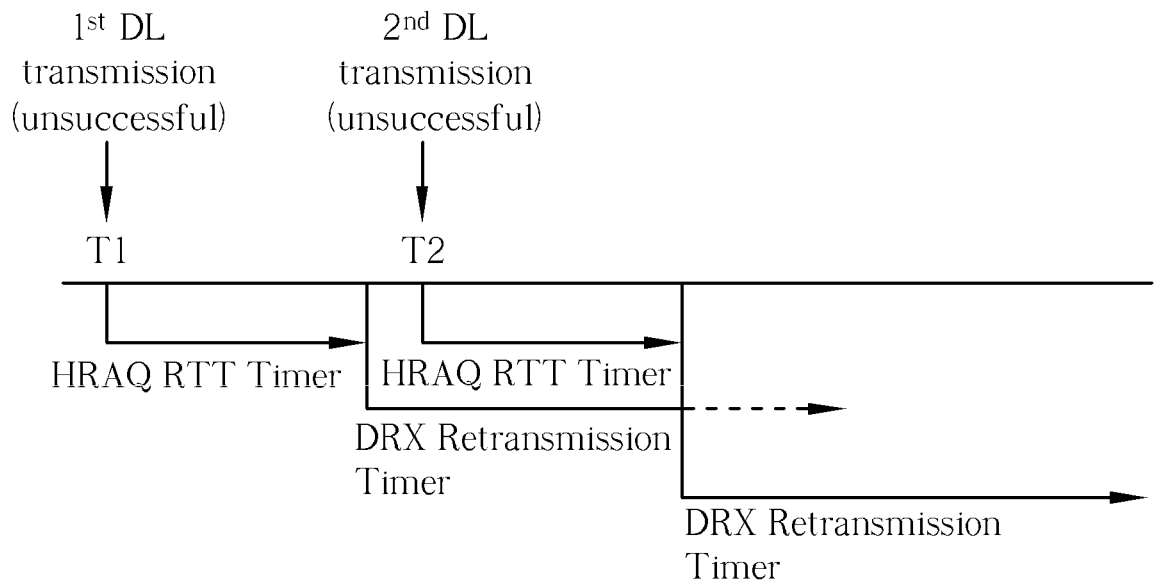
FIG. 1 illustrates operation of a DRX Retransmission Timer according to the prior art.
Figure 2:
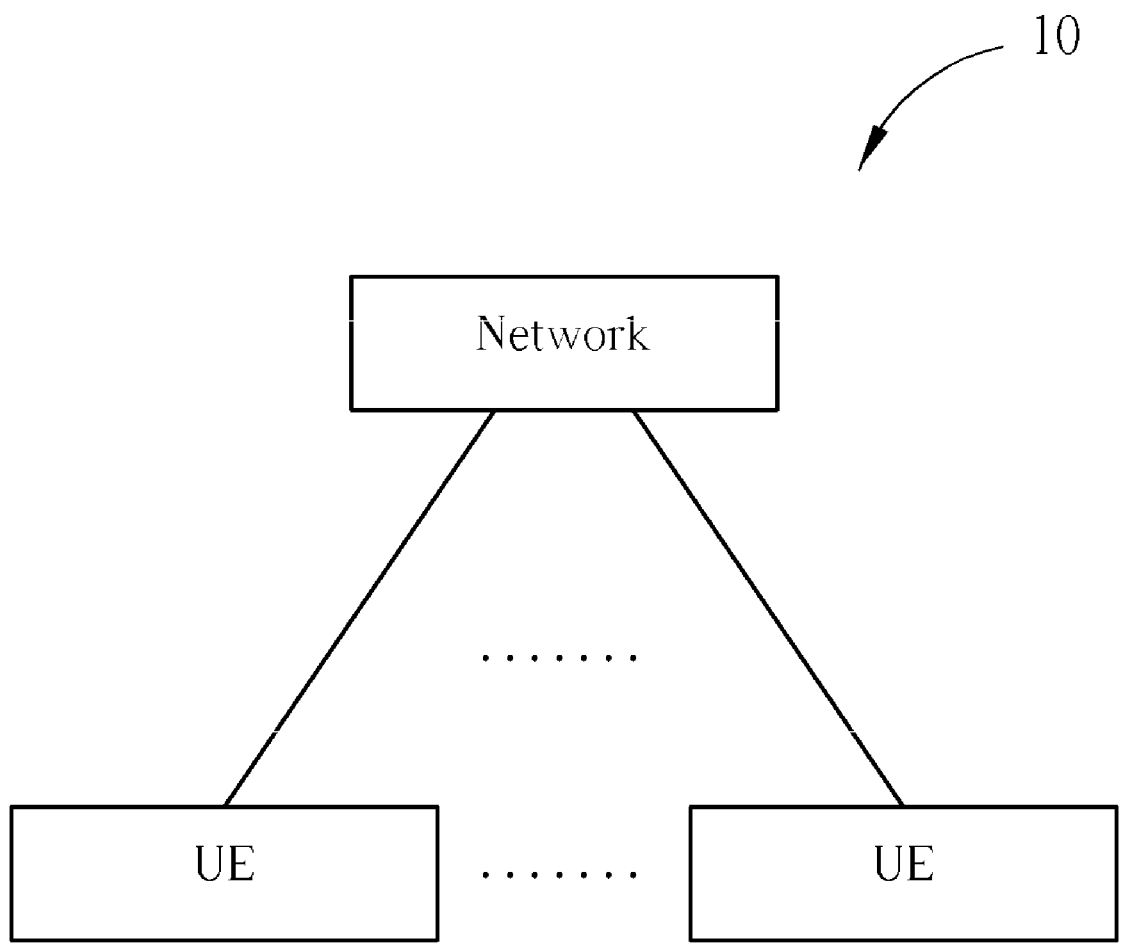
FIG. 2 is a schematic diagram of a wireless communication system.

Please refer to FIG. 2, which is a schematic diagram of a wireless communications system 10. The wireless communications system 10 is preferred to be a Long Term Evolution (LTE) communications system, and is briefly formed with a network terminal and a plurality of user equipments. In FIG. 2, the network terminal and the user equipments are simply utilized for illustrating the structure of the wireless communications system 10. Practically, the network terminal may include a plurality of evolved base stations (eNBs), an evolved UMTS radio access network (EUTRAN) and so on according to actual demands, and the user equipments (UEs) can be apparatuses such as mobile phones, computer systems, etc.

Figure 3:
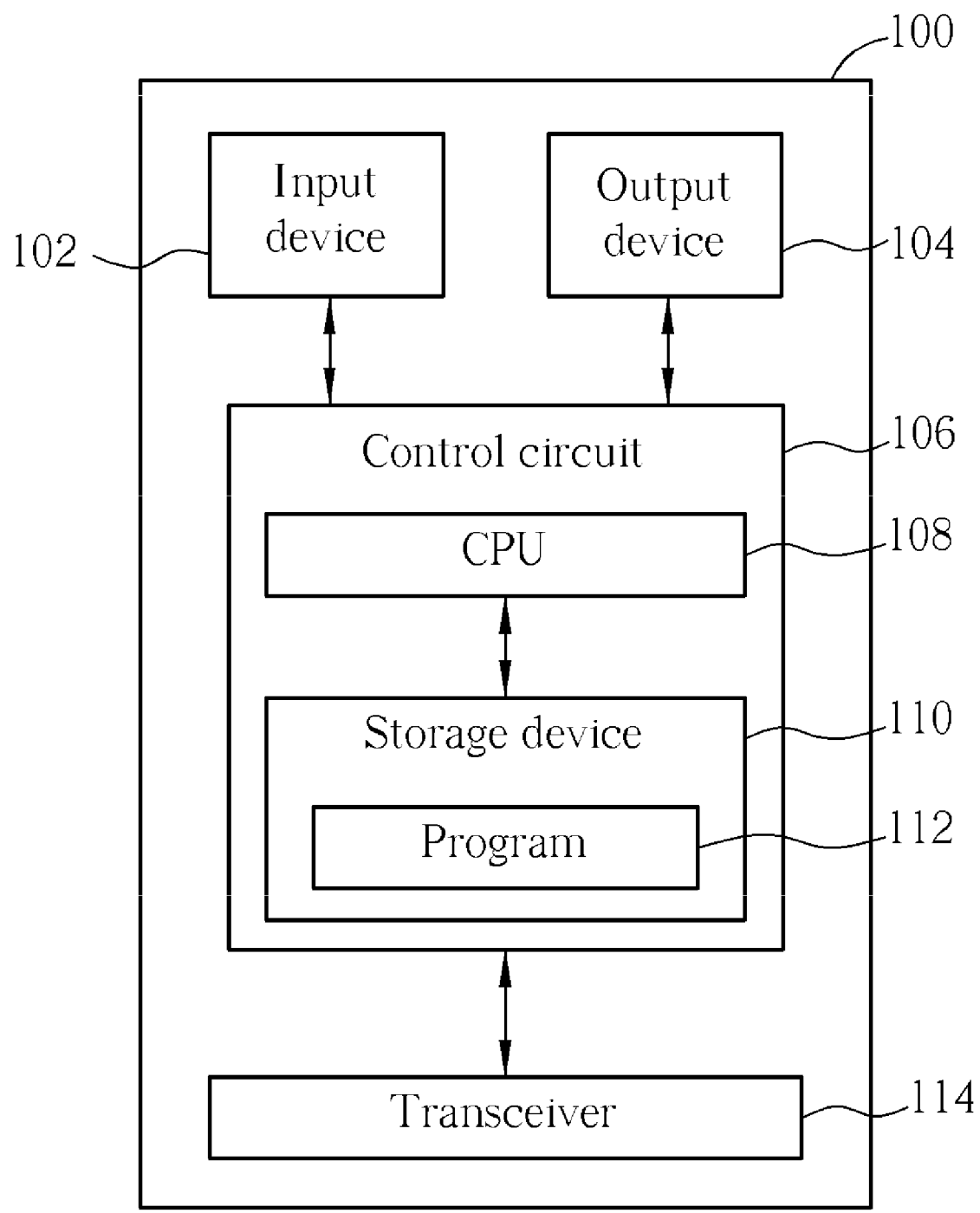
FIG. 3 is a functional block diagram of a wireless communication device.

Please refer to FIG. 3, which is a functional block diagram of a communications device 100. The communications device 100 can be utilized for realizing the UEs in FIG. 2. For the sake of brevity, FIG. 3 only shows an input device 102, an output device 104, a control circuit 106, a central processing unit (CPU) 108, a memory 110, a program 112, and a transceiver 114 of the communications device 100. In the communications device 100, the control circuit 106 executes the program 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3.

Figure 4:
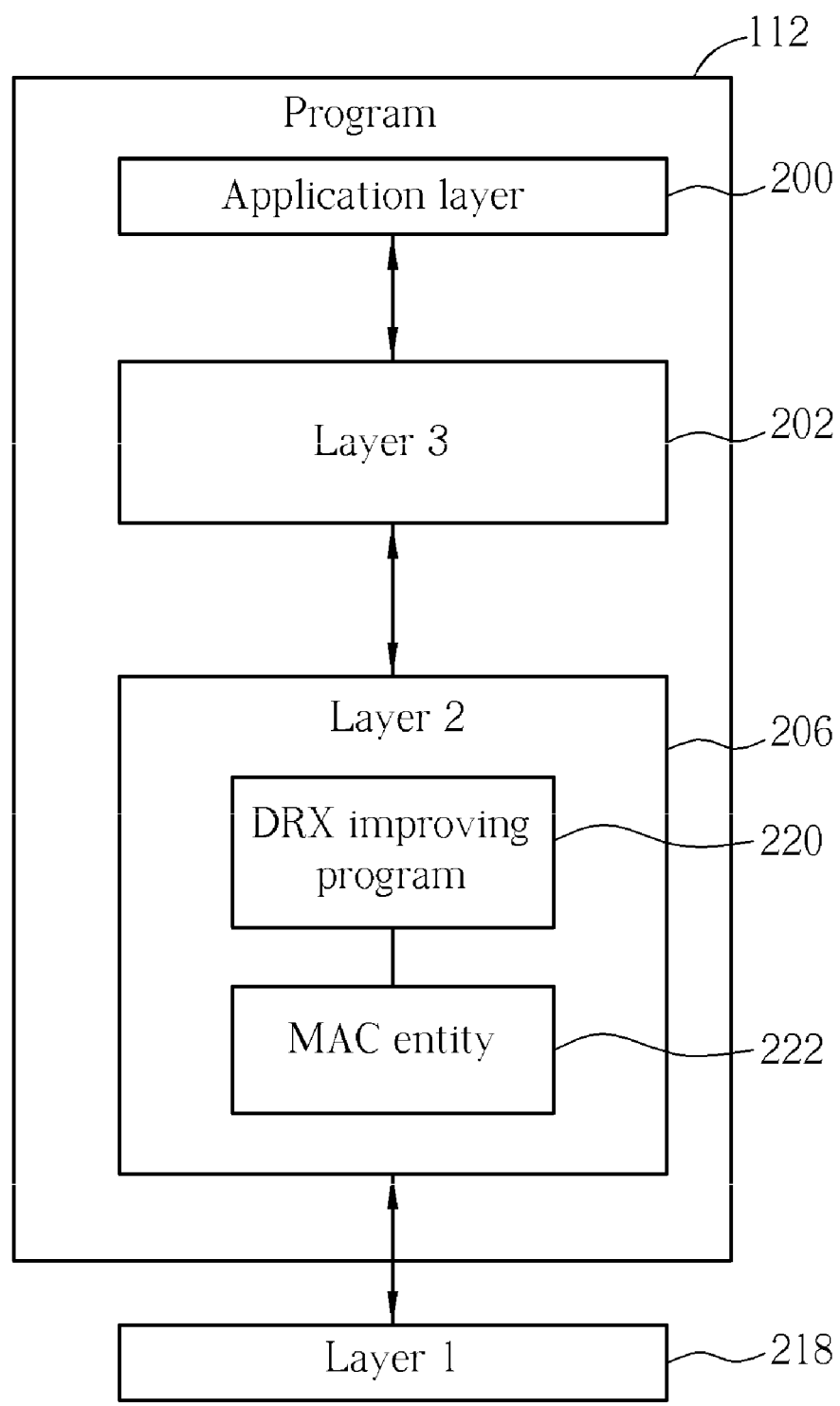
FIG. 4 is a schematic diagram of the program shown in FIG. 2.

Please continue to refer to FIG. 4. FIG. 4 is a schematic diagram of the program 112 shown in FIG. 3. The program 112 includes an application layer 200, a Layer 3 202, and a Layer 2 206, and is coupled to a Layer 1 208. The Layer 2 206 includes a media access control (MAC) entity 222 capable of simultaneously performing multiple Hybrid Automatic Repeat Request (HARQ) processes with a evolved Node-B (eNB) for packet reception and supporting discontinuous reception (DRX) functionality. When the DRX functionality is executed by the MAC entity 222 according to Radio Resource Control (RRC) commands of the Layer 3 202, a DRX improving program 220 is provided for the program 112 to reduce power consumption of the UE according to an embodiment of the present invention.

Figure 5:
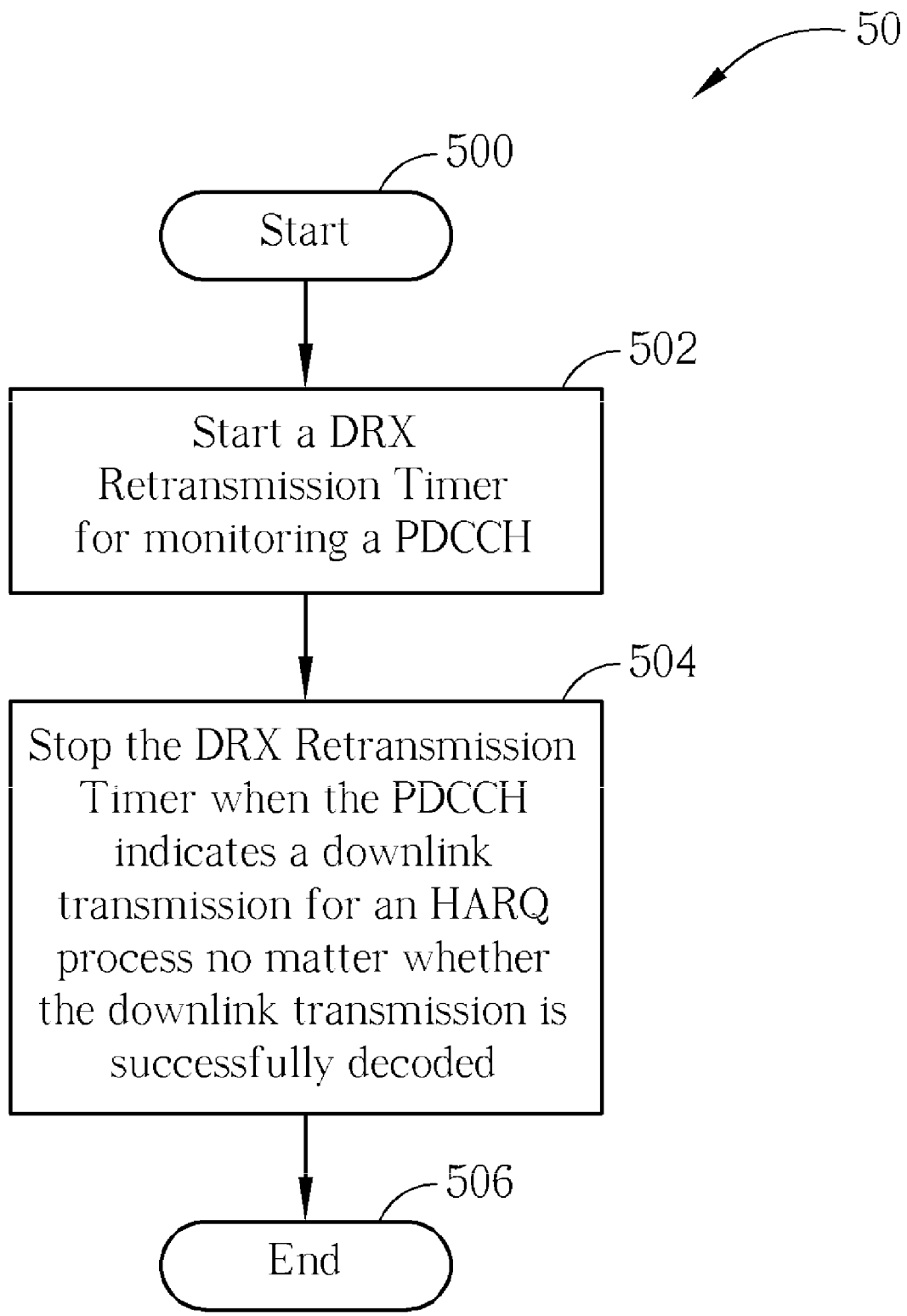
FIG. 5 is a flow chart of a process according to an embodiment of the present invention.

Please refer to FIG. 5, which is a flow chart of a process 50 according to an embodiment of the present invention. The process 50 is used for improving DRX functionality for a UE of a wireless communication system and can be compiled into the DRX improving program 220. The process 50 includes the following steps:

Step 500: Start.

Step 502: Start a DRX Retransmission Timer for monitoring a Physical Downlink Control Channel (PDCCH).

Step 504: Stop the DRX Retransmission Timer when the PDCCH indicates a downlink transmission for a Hybrid Automatic Repeat Request (HARQ) process no matter whether the downlink transmission is successfully decoded.

Step 506: End.

According to the process 50, the UE, in use of the DRX functionality, starts the DRX Retransmission Timer for monitoring the PDCCH to detect a downlink transmission of a concerned HARQ process. In such a situation, when the PDCCH indicates a downlink transmission for the HARQ process, the DRX Retransmission Timer is stopped no matter whether the downlink transmission is successfully decoded.

In the embodiment of the present invention, the downlink transmission is not limited to a retransmission of the HARQ process, but also can be a new transmission of the HARQ process. In addition, steps of realizing the DRX functionality can further be included in the process 50, and are not limited herein. For example, the DRX Retransmission Timer is started when an HARQ Round Trip Time Timer (HARQ RTT Timer) corresponding to the HARQ process expires; and the HARQ RTT Timer is started when the PDCCH indicates the downlink transmission for the HARQ process. Please note that other operations of the DRX functionality irrelevant to the embodiment of the present invention can be seen in the prior art and are not described herein.

Thus, compared to the prior art that the DRX Retransmission Timer is stopped only when the retransmission packet of the HARQ process is successfully decoded, the UE of the present invention stops the DRX Retransmission Timer as soon as the PDCCH indicates a downlink transmission for the concerned HARQ process no matter whether the downlink transmission is successfully decoded. As a result, the embodiment of the present invention can prevent the UE from unnecessarily monitoring the PDCCH during a signaling round trip time of the HARQ process, so as to reduce power consumption of the UE.

Figure 6:
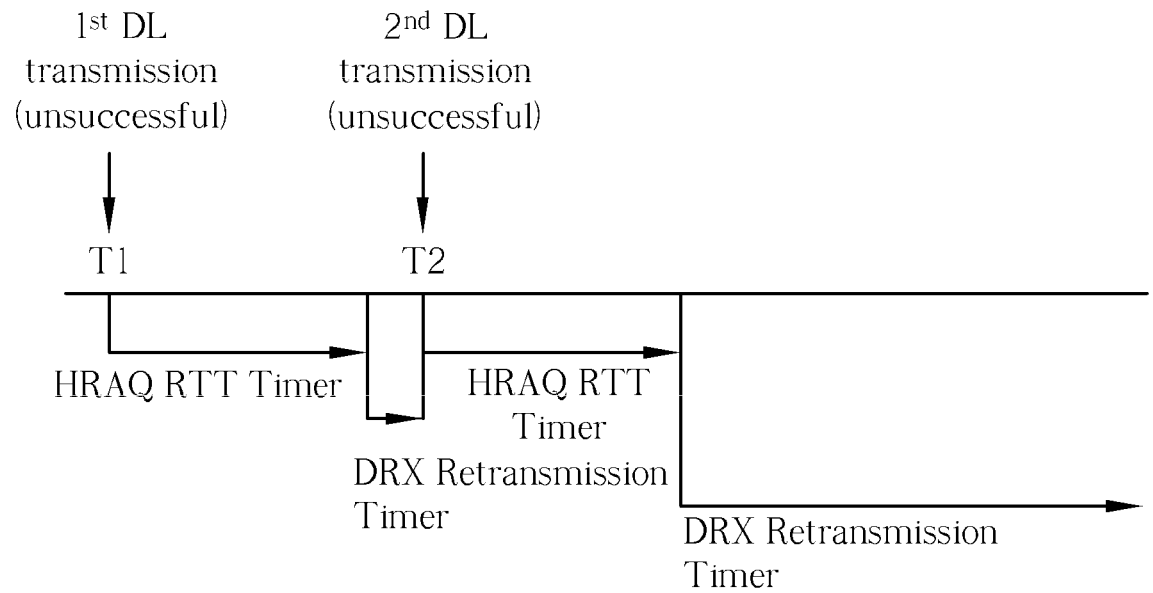
FIG. 6 illustrates operation of a DRX Retransmission Timer according to an embodiment of the present invention.

For example, please refer to FIG. 6, which illustrates operation of a DRX Retransmission Timer according to an embodiment of the present invention. As shown in FIG. 6, at time Ti, if the PDCCH indicates the UE a downlink transmission packet of a HARQ process, the HARQ RTT Timer is started. Assume the transmission packet is not decoded successfully, after the HARQ RTT Timer expires, the DRX Retransmission Timer is started and the UE startes to monitor the PDCCH for detecting retransmission packets of the HARQ process.

Since the DRX Retransmission Timer is running, if the PDCCH indicates the UE another downlink transmission packet for the HARQ process at time T2, for example, the DRX Retransmission Timer is stopped no matter whether the packet is successfully decoded. In this case, assume the packet is still not successfully decoded, the DRX Retransmission Timer would be started again to detect retransmission packets of the HARQ process when the HARQ RTT Timer expires. Therefore, in the embodiment of the present invention, the situations that the UE monitors the PDCCH during the signaling round trip time of the HARQ process can be avoided and the power consumption of the UE can thus be reduced.

As mentioned above, the embodiment of the present invention improves stop mechanism of the DRX Retransmission Timer of the DRX functionality for preventing the UE from unnecessarily monitoring the PDCCH during the signaling round trip time of the HARQ process, so as to reduce power consumption of the UE.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of improving discontinuous reception (DRX) functionality for a user equipment (LIE) of a wireless communications system. the method comprising:
    starting a DRX Retransmission Tinier for monitoring a Physical Downlink Control Channel (PDCCH): and
    stopping the DRX Retransmission Timer when the PDCCH indicates a downlink transmission for a Hybrid Automatic Repeat Request (HARQ) process before decoding the downlink transmission is completed.

2. The method of claim 1, wherein the downlink transmission is a retransmission of the HARQ process.

3. The method of claim 1, wherein the downlink transmission is a new transmission of the HARQ process.

4. The method of claim 1, wherein the DRX Retransmission Timer is started when an HARQ Round Trip Time Timer (HARQ RTT Timer) corresponding to the HARQ process expires.

5. The method of claim 4, wherein the HARQ RTT Timer is started when the PDCCH indicates a downlink transmission for the HARQ process.

6. A communications device for a user equipment (UE) improving discontinuous reception (DRX) functionality in a wireless communications system, the communications device comprising:
    a processor for executing a process: and
    a storage device, coupled to the processor, for storing a program for executing the process, wherein the process comprises:
        starting a DRX Retransmission Timer for monitoring a Physical Downlink Control Channel (PDCCH); and
        stopping the DRX Retransmission Timer when the PDCCH indicates a downlink transmission for a Hybrid Automatic Repeat Request (HARQ) process before decoding of the downlink transmission is completed.

7. The communications device of claim 6, wherein the downlink transmission is a retransmission of the HARQ process.

8. The communications device of claim 6, wherein the downlink transmission is a new transmission of the HARQ process.

9. The communications device of claim 6, wherein the DRX Retransmission Timer is started when an HARQ Round Trip Time Timer (HARQ RTT Timer) corresponding to the HARQ process expires.

10. The communications device of claim 9, wherein the HARQ RTT Timer is started when the PDCCH indicates a downlink transmission for the HARQ process.

* * * * *